United States Patent [19]

Müller

[11] Patent Number: 4,565,107
[45] Date of Patent: Jan. 21, 1986

[54] BALL THROUGH-PASSAGE FOR THE GEARSHIFTING LEVER OF A MOTOR VEHICLE

[75] Inventor: Robert Müller, Weissach Konstrukteur, Fed. Rep. of Germany

[73] Assignee: Dr. Ing. h.c.F. Porsche A.G., Fed. Rep. of Germany

[21] Appl. No.: 576,401

[22] Filed: Feb. 2, 1984

[30] Foreign Application Priority Data

Feb. 17, 1983 [DE] Fed. Rep. of Germany ....... 3305422

[51] Int. Cl.⁴ .......................... G05G 9/12; F16C 11/08
[52] U.S. Cl. .................................... 74/473 P; 403/128
[58] Field of Search .................. 74/473 R, 473 P; 403/114, 115, 127, 128, 132, 133; 248/288.3, 288.5, 481, 482

[56] References Cited

U.S. PATENT DOCUMENTS

| 1,488,989 | 4/1924 | Kruchten | 403/128 |
| 1,852,979 | 4/1932 | Moorhouse | 74/473 P |
| 1,856,246 | 5/1932 | Frederick | 403/128 |
| 3,182,329 | 5/1965 | Biesecker | 74/473 P |
| 3,315,537 | 4/1967 | Keller | 74/473 P |
| 3,482,465 | 12/1969 | Lusted | 74/473 P |
| 3,850,047 | 11/1974 | Davis | 74/473 P |
| 4,132,124 | 1/1979 | Iida | 74/473 R |
| 4,492,130 | 1/1985 | Lamy et al. | 74/473 P |

FOREIGN PATENT DOCUMENTS 1802987 9/1959 Fed. Rep. of Germany .
1954289 9/1966 Fed. Rep. of Germany .

Primary Examiner—Craig R. Feinberg
Assistant Examiner—W. R. Wolfe
Attorney, Agent, or Firm—Craig & Burns

[57] ABSTRACT

A ball-type through-passage serves for the pivotal support of the gearshifting lever of a motor vehicle, which consists of two ball halves split along the gear-shifting lever and abutting thereat and of a two-partite bearing housing receiving the same. In order to compensate for radial play, two O-rings are inserted between the ball halves and the gearshifting lever. For the axial fixation radial pins are formed-on at the ball halves, which engage in radial bores of the gearshifting lever.

10 Claims, 1 Drawing Figure

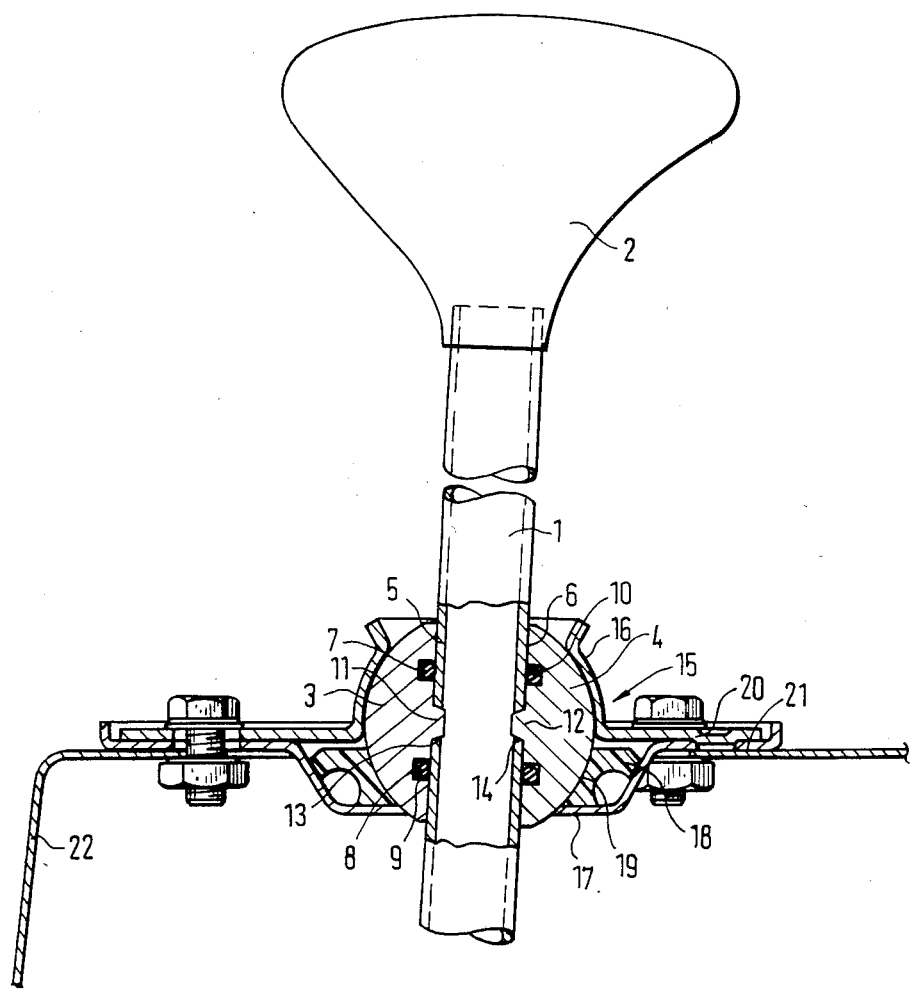

BALL THROUGH-PASSAGE FOR THE GEARSHIFTING LEVER OF A MOTOR VEHICLE

The present invention relates to a ball-type through-passage for the gearshifting lever of a motor vehicle, by means of which the gearshifting lever is pivotally supported at a body part.

Such a ball through-passage is known from the German Gebrauchmuster No. 1,954,389. Two ball halves provided with cylindrical recesses abut at the cylinder gearshifting lever on both sides thereof and are connected therewith by a clamping pin extending transversely therethrough. The ends of the clamping pin project on both sides beyond the ball surface and engage in concave longitudinal grooves which are provided in two bearing rings disposed at a distance one above the other. The bearing rings are accommodated in a support flange of a transmission housing. They are held together by a retaining ring and by an interposed rubber ring and are secured against rotation by a locking pin.

This prior art construction is quite costly as regards manufacture and assembly. It additionally entails the disadvantage that it does not enable a tolerance compensation in the radial direction, perpendicular to the gearshifting lever, which is disadvantageous in particular with the use of plastic materials which exhibit large tolerances already during the manufacture by injection molding or die casting and possess relatively large fluctuations in their dimensions, conditioned by moisture and temperature changes.

The task of the present invention resides in providing a ball through-passage simple from a manufacturing point of view which enables a clearance-free, jointed bearing support of the gearshifting lever.

The underlying problems are solved according to the present invention in that two O-rings are inserted between the ball halves and the gearshifting lever, which are retained in annular grooves, and in that the two ball halves are secured against axial displacement on the gearshifting lever by form-locking detents.

Since the two ball halves which are preferably made of plastic material, are not rigidly clamped together and abut at the gearshifting lever with radial play or clearance, they are able to expand freely during temperature and moisture changes without having to fear a jamming. The O-rings inserted between the ball halves and the gearshifting lever under prestress take care for a clearance compensation so that the gearshifting lever which is constructed as non-finished smooth tubular member, always lies flush in the ball joint.

If according to further features of the present invention pins are molded-on at the ball halves for the axial fixing on the gearshifting lever, which engage in bores of the gearshifting lever, a separate fixing part can be dispensed with altogether.

According to still further features of the present invention spherically shaped recesses are pressed into the bearing housing consisting of two shells for accommodating and mounting the ball halves. Thus, no expensive machined parts are necessary for the ball through-passage according to the present invention but only cold-deformed steel sheet-metal parts and plastic injection molded parts are required which can be manufactured in a cost favorable manner and can be assembled in a simple manner.

These and other objects, features and advantages of the present invention will become more apparent from the following description when taken in connection with the accompanying drawing which shows, for purposes of illustration only, one embodiment in accordance with the present invention, and wherein:

The single FIGURE is a cross sectional view through one embodiment of a ball through-passage for a gearshifting lever in accordance with the present invention.

Referring now to the single FIGURE of the drawing, a gearshifting lever 1 which is constructed as non-finished smooth tubular member and which includes a handle part 2, is surrounded with radial clearance by two ball halves 3 and 4 which are injection molded from plastic material and are provided with cylindrical recesses 5 and 6. O-rings 7 and 8 are interposed between the two ball halves 3 and 4 and the gearshifting lever 1, which are retained in annular grooves 9 and 10 of the cylindrical recesses 5 and 6.

Pins 11 and 12 which project radially from the cylindrical recesses 5 and 6 are molded integrally with the ball halves 3 and 4 centrally between the O-rings 7 and 8; the pins 11 and 12 thereby engage into bores 13 and 14 of the gear-shifting lever 1. The spherical surfaces of the two ball halves 3 and 4 abut at a bearing housing 15 which consists of a shell-shaped upper part 16 and of a lower part 17. The upper part 16 made of sheet-metal steel is thereby formed spherically shaped; an elastically deformable plastic ring 18 is secured in the lower part 17 whose spherically shaped surfaces 19 elastically abut at the ball halves 3 and 4 and seal the same. The upper part 16 and the lower part 17 are threadably fastened together also to a body part 22 along the flanges 20 and 21 which body part 22 forms the vehicle tunnel.

While I have shown and described only one embodiment in accordance with the present invention, it is understood that the same is not limited thereto but is susceptible of numerous changes and modifications as known to those skilled in the art and I therefore do not wish to be limited to the details shown and described herein but intend to cover all such changes and modifications as are encompassed by the scope of the appended claims.

I claim:

1. A ball through-passage for a gearshifting lever of a motor vehicle, comprising a spherically shaped fixed bearing housing, two ball halves split along a cylindrical gearshifting lever and abutting at the gearshifting lever by way of cylindrical recesses, the ball-shaped surfaces of said ball halves abutting at the spherically shaped fixed bearing housing, two O-rings inserted between the ball halves and the gearshifting lever which are retained in annular grooves, and form-locking detent means for securing the two ball halves against axial displacement on the gearshifting lever.

2. A ball through-passage according to claim 1, wherein substantially radially projecting pins are provided at the recesses of the two ball halves between the annular grooves, which engage in correspondingly shaped apertures of the gearshifting lever.

3. A ball through-passage according to claim 2, wherein the pins have a circular cross section and are slightly conically constructed and engage in radial bores of the gearshifting lever which is otherwise constructed as unfinished smooth tubular member.

4. A ball through-passage according to claim 1, wherein the spherically shaped fixed bearing housing consists of an upper part and of a lower part, the two parts being constructed in the shape of shells, are spherically shaped and are threadedly connected with each other as well as with a body part of the motor vehicle.

5. A ball through-passage according to claim 4, wherein a spring-elastic plastic ring means is secured in the lower part which is provided with spherically shaped surface means abutting at the ball halves.

6. A ball through-passage according to claim 1, wherein the annular grooves for the two O-rings are provided in the cylindrical recesses of the two ball halves.

7. A ball through-passage according to claim 6, wherein substantially radially projecting pins are provided at the recesses of the two ball halves between the annular grooves, which engage in correspondingly shaped apertures of the gearshifting lever.

8. A ball through-passage according to claim 7, wherein the pins have a circular cross section and are slightly conically constructed and engage in radial bores of the gearshifting lever which is otherwise constructed as unfinished smooth tubular member.

9. A ball through-passage according to claim 8, wherein the bearing housing consists of an upper part and of a lower part, the two parts being constructed in the shape of shells, are spherically shaped and are threadedly connected with each other as well as with a body part of the motor vehicle.

10. A ball through-passage according to claim 8, wherein a spring-elastic plastic ring means is secured in the lower part which is provided with spherically shaped surface means abutting at the ball halves.

* * * * *